US007916601B2

(12) United States Patent
Kim et al.

(10) Patent No.: US 7,916,601 B2
(45) Date of Patent: Mar. 29, 2011

(54) OPTICAL RECORDING/REPRODUCING WRITE STRATEGY METHOD, MEDIUM, AND APPARATUS

(75) Inventors: Joo-youp Kim, Seongnam-si (KR); Seung-bum Lee, Yongin-si (KR); Jong-hoon Lee, Yongin-si (KR); Sung-yong Chung, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 333 days.

(21) Appl. No.: 12/285,564

(22) Filed: Oct. 8, 2008

(65) Prior Publication Data

US 2009/0092016 A1 Apr. 9, 2009

(30) Foreign Application Priority Data

Oct. 9, 2007 (KR) ........................ 10-2007-0101683

(51) Int. Cl.
*G11B 7/00* (2006.01)

(52) U.S. Cl. .................................................... 369/59.11

(58) Field of Classification Search ........................ None
See application file for complete search history.

(56) References Cited

U.S. PATENT DOCUMENTS

| | | | | |
|---|---|---|---|---|
| 7,675,831 | B2 * | 3/2010 | Minemura | 369/59.11 |
| 7,773,479 | B1 * | 8/2010 | Sutardja et al. | 369/59.11 |
| 2006/0215524 | A1 * | 9/2006 | Liu et al. | 369/59.11 |
| 2008/0062842 | A1 * | 3/2008 | Kishigami et al. | 369/59.11 |

FOREIGN PATENT DOCUMENTS

| | | |
|---|---|---|
| JP | 2003-298514 | 10/2002 |
| JP | 2003-151220 | 5/2003 |
| JP | 2004-1013100 | 4/2004 |
| JP | 2005-158159 | 6/2005 |
| JP | 2006-302402 | 11/2006 |
| KR | 10-2005-0018593 | 2/2005 |
| KR | 10-2006-0053826 | 5/2006 |
| KR | 10-2006-0130566 | 12/2006 |
| KR | 10-2007-0051882 | 5/2007 |

* cited by examiner

*Primary Examiner* — Joseph Haley
(74) *Attorney, Agent, or Firm* — NSIP Law

(57) ABSTRACT

A write strategy method, medium, and apparatus. The method includes writing a signal to a storage medium by using a predetermined power and an initial write strategy, calculating variation characteristics of a data signal which separately correspond to variations of write strategy parameters, if the written signal does not satisfy initial quality standards, and calculating correlations among periods of the data signal and correlations among the write strategy parameters by using the variation characteristics of the data signal, and determining the write strategy parameters based on the correlations among the periods of the data signal and the correlations among the write strategy parameters.

27 Claims, 13 Drawing Sheets

| Window | Ave(Pos) | σ/T(Pos) | Ave(Neg) | σ/T(Neg) |
|---|---|---|---|---|
| 2T | 32.1025ns | 16.192769% | 33.4900ns | 10.949394% |
| 3T | 45.8175ns | 19.683110% | 46.7700ns | 11.501349% |
| 4T | 59.6650ns | 18.583796% | 59.2825ns | 24.333879% |
| 5T | 74.0200ns | 20.937412% | 72.6100ns | 25.097322% |
| 6T | 89.7425ns | 19.688609% | 87.8175ns | 19.460687% |
| 7T | 105.1150ns | 19.147934% | 103.6975ns | 16.641233% |
| 8T | 121.0450ns | 19.078981% | 119.1425ns | 15.657225% |
| 9T | 135.125ns | 18.643087% | 134.925ns | 13.303162% |

| Window | Ave(Pos) | σ/T(Pos) | Ave(Neg) | σ/T(Neg) |
|---|---|---|---|---|
| 2T | 31.4275ns | 7.395161% | 30.3075ns | 7.534976% |
| 3T | 45.8725ns | 6.782875% | 44.8325ns | 7.258268% |
| 4T | 59.9475ns | 6.931974% | 60.2900ns | 6.129582% |
| 5T | 74.3475ns | 8.478956% | 74.5450ns | 9.524358% |
| 6T | 89.9575ns | 8.070507% | 89.9550ns | 10.301598% |
| 7T | 105.3950ns | 7.920154% | 105.5325ns | 8.979775% |
| 8T | 120.4975ns | 7.488192% | 120.6900ns | 9.034791% |
| 9T | 135.350ns | 7.898407% | 136.025ns | 8.753602% |

OPTICAL RECORDING/REPRODUCING WRITE STRATEGY METHOD, MEDIUM, AND APPARATUS

CROSS-REFERENCE TO RELATED APPLICATIONS

This application claims the benefit of Korean Patent Application No. 10-2007-0101683, filed on Oct. 9, 2007, in the Korean Intellectual Property Office, the disclosure of which is incorporated herein in its entirety by reference.

BACKGROUND

1. Field

One or more embodiments of the present invention relate to a write strategy method, medium, and apparatus, and more particularly, to a method, medium, and apparatus, including an optical recording/reproducing method, medium, and apparatus, automatically generating and providing an optimized write strategy in accordance with a specific writing characteristic of each optical disc drive.

2. Description of the Related Art

In order to write predetermined data to an optical medium, a laser diode is modulated in accordance with an encoded electric signal. In this case, a pulse type of the laser diode is modulated so that an optical recording/reproducing apparatus has an optimized writing characteristic. Determining the pulse type of the laser diode corresponds to designing a write strategy. However, in order to design the write strategy, an innumerably large number of write strategy parameters, which specifically represent the pulse type, are separately defined.

Here, the recording/reproducing apparatus is a recording device, such as an optical disc drive, that may write data by using a light source such as a laser. Examples of the corresponding medium include a compact disc-recordable (CD-R), a digital video disc (DVD), a digital video disc-recordable (DVD-R), and a compact disc-rewritable (CD-RW).

Various types of data may be written to or stored on the underlying optical recording medium. The types of data generated by using a non return to zero, inverted (NRZI) modulation, method will now be described with reference to FIGS. 1A through 1D. Hereinafter, a signal generated by using the NRZI modulation method will be referred to as an NRZI signal.

FIG. 1A illustrates write strategy parameters and a type of laser diode pulse which are used for a CD-R, a DVD-R, or an organic blue-ray disc-recordable (BD-R).

Referring to FIG. 1A, a referenced data signal 101 corresponds to an actual data signal to be written. The waveform of the data signal 101 is generated by using an NRZI modulation method. The data signal 101 is shown as having a value of 1000001. Here, a logic high level is referred to as a mark and a logic low level is referred to as a space.

A laser diode signal 103 corresponds to a laser diode signal in accordance with a write strategy applied to a DVD-R or an organic BD-R. That is, in order to write the data signal 101, the write strategy has to be designed so as to generate the laser diode signal 103 as illustrated in FIG. 1. Referenced parameters $P_B$, $P_C$, $dT_{top}$, OD, $dT_{LP}$, $dT_E$, $T_{LP}$ and the like are referred to as the write strategy parameters. That is, in order to design the write strategy, each of the write strategy parameters has to be defined.

FIG. 1B is a diagram illustrating write strategy parameters and a type of laser diode pulse which are used for a CD-RW high speed (HS)/low speed (LS), a DVD-R normal speed (NS), a BD-R, or a blue-ray disc-rewritable (BD-RW) LS.

Referring to FIG. 1B, in order to write a data signal 111 on a CD-RW HS/LS, a DVD-R NS, a BD-R, or a BD-RW LS, a laser diode signal 113 has to be generated. Here, the write strategy parameters such as $P_E$, dTtop, $P_{OD}$, and $T_{MP}$ have to be defined.

FIG. 1C is a diagram illustrating write strategy parameters and a type of laser diode pulse which are used for a CD-RW ultra speed (US) or a digital video disc-rewritable (DVD-RW) HS.

Referring to FIG. 1C, in order to write a data signal 121 to a CD-RW US or a DVD-RW HS, a laser diode signal 123 has to be generated. All parameters illustrated in FIG. 1C have to be defined in order to design a write strategy of the CD-RW US or the DVD-RW HS.

FIG. 1D is a diagram illustrating write strategy parameters and a type of laser diode pulse which are used for a BD-RW HS.

Referring to FIG. 1D, in order to write a data signal 131 to a BD-RW HS, a laser diode signal 133 has to be generated. All parameters illustrated in FIG. 1D have to be defined in order to design a write strategy of the BD-RW HS.

The write strategy parameters, such as $dT_{top}$, $T_{OD}$, $T_{top}$, $dT_{MP}$, $T_{MP}$, $dT_{LP}$, $T_{LP}$, and $dT_E$ which are illustrated in FIGS. 1A through 1D, are separately and differently defined in accordance with the standards and type of the recording medium, such as a writing speed, a writing characteristic of a manufacturer, set deviations of an optical disc drive, and a writing environment. However, in general, the manufacturer of the optical disk drive optimizes and determines the write strategy parameters during manufacture in accordance with the standards and type of the recording medium, such that select write strategy parameters are fixed post-manufacture. In this case, the manufacturer determines the optimized write strategy parameters by analyzing periodical lengths of an NRZI pattern and the amount of timing jitter. The determining of the optimized write strategy parameters is referred to as the designing of a write strategy.

FIG. 2 illustrates a conventional method of designing, storing, and authenticating a write strategy for an optical recording medium.

Referring to FIG. 2, the conventional method includes operations 210, 220, and 230. First, in operation 210, a manufacturer designs the write strategy by analyzing periodical lengths of an NRZI pattern and the amount of timing jitter and by determining optimized write strategy parameters.

In operation 220, the write strategy designed in operation 210 is stored in firmware. The write strategy may be stored in a memory of an optical recording/reproducing apparatus by performing porting, compiling, and downloading processes.

The optical recording/reproducing apparatus may, thus, store the write strategy optimized for a recording medium, a writing speed, and information on a manufacturer of the recording medium. The stored write strategy will be read and executed later.

Then, a writing operation is performed by using the write strategy determined in operation 210. By performing the writing operation, the write strategy may be authenticated in terms of whether it has been correctly designed, in operation 230. After the authenticating, if the quality of the write strategy is below an acceptable quality level, the write strategy is modified or redesigned by tuning certain parameters.

However, several hundred types of optical disc drives are produced by different manufacturers. Accordingly, quite a large amount of time is required to design a write strategy by determining optimized write strategy parameters of each type of optical disc drive. Also, a large part of a production period of the optical disk drive involves designing the write strategy.

Furthermore, a certain optical recording/reproducing apparatus may not easily determine all optimized write strategies for all conventionally released optical recording media produced by all manufacturers.

In the above-described conventional method, an innumerably large number of combinations of write strategy parameters for each optical recording medium may not be easily measured and thus optimized write strategy parameters may not be easily determined.

Still further, in optical recording/reproducing apparatuses of the same model, write strategy parameters may have deviations for different settings. However, the conventional method does not consider these set deviations and thus does not compensate for the set deviations.

In addition, when a new optical recording medium is released, a newly designed write strategy applicable to the new optical recording medium and firmware for a corresponding optical recording/reproducing apparatus has to be upgraded. That is, a firmware upgrade has to be performed in order for a conventional optical recording/reproducing apparatus, which is using the new optical recording medium, to execute an appropriate optimized write strategy.

The write strategy is very important for determining the quality of all data to be stored in and be read from an optical recording medium. However, as described above, the conventional methods may not compensate for deviations of write strategy parameters that exist regarding the optical recording medium and the optical recording/reproducing apparatus. Furthermore, when a new optical recording medium is released, conventional methods may not appropriately cope with new optical recording media and may not generate and use an appropriate or optimized write strategy.

SUMMARY

One or more embodiments of the present invention provide a method, medium, and apparatus, inclusive of an optical recording/reproducing method, medium, and apparatus, automatically generating and providing an optimized write strategy.

Additional aspects and/or advantages will be set forth in part in the description which follows and, in part, will be apparent from the description, or may be learned by practice of the invention.

To achieve the above and/or other aspects and advantage, embodiments of the present invention include a method of generating and providing a write strategy, the method including writing a signal to a storage medium using a predetermined power and an initial write strategy, calculating variation characteristics of a data signal, read from the storage medium, which separately correspond to variations of write strategy parameters, if the written signal, as read from the storage medium, does not satisfy defined quality standards, and calculating correlations among periods of the data signal and correlations among the write strategy parameters using the variation characteristics of the data signal, and determining corresponding write strategy parameters for a write strategy for subsequent writing to the storage medium based on the calculated correlations among the periods of the data signal and the calculated correlations among the write strategy parameters.

To achieve the above and/or other aspects and advantage, embodiments of the present invention include a method of generating and providing a write strategy by an optical recording/reproducing apparatus, the method including determining whether the optical recording/reproducing apparatus supports a stored write strategy corresponding to an optical recording medium carried by the optical recording/reproducing apparatus, writing a signal to the optical recording medium using a predetermined power and a default write strategy, if the optical recording/reproducing apparatus does not support the stored write strategy, calculating variation characteristics of a data signal, read from the optical recording medium, which separately correspond to variations of write strategy parameters, if the written signal, as read from the optical recording medium, does not satisfy defined quality standards, and calculating correlations among periods of the data signal and correlations among the write strategy parameters by using the variation characteristics of the data signal, and determining corresponding write strategy parameters for a write strategy for subsequent writing to the optical recording medium based on the calculated correlations among the periods of the data signal and the calculated correlations among the write strategy parameters.

To achieve the above and/or other aspects and advantage, embodiments of the present invention include an optical recording/reproducing apparatus including an encoder to convert information data transmitted from a host into a signal to be recorded to an optical recording medium, and a write strategy generator to perform a writing operation of the signal using an optimized write strategy, wherein the write strategy generator writes the signal to the optical recoding medium using a predetermined power and an initial write strategy, and, based upon a determination of whether a signal read from the optical recording medium corresponding to the written signal satisfies defined quality standards, the write strategy generator writes a data signal to the optical recording medium by varying each of plural write strategy parameters in an operation range and calculates write strategy parameters for a write strategy for subsequent writing to the optical recording medium based on calculated correlations among periods of the data signal, as read from the optical recording medium, and calculated correlations among the plural write strategy parameters, as observed from the read data signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 1A:
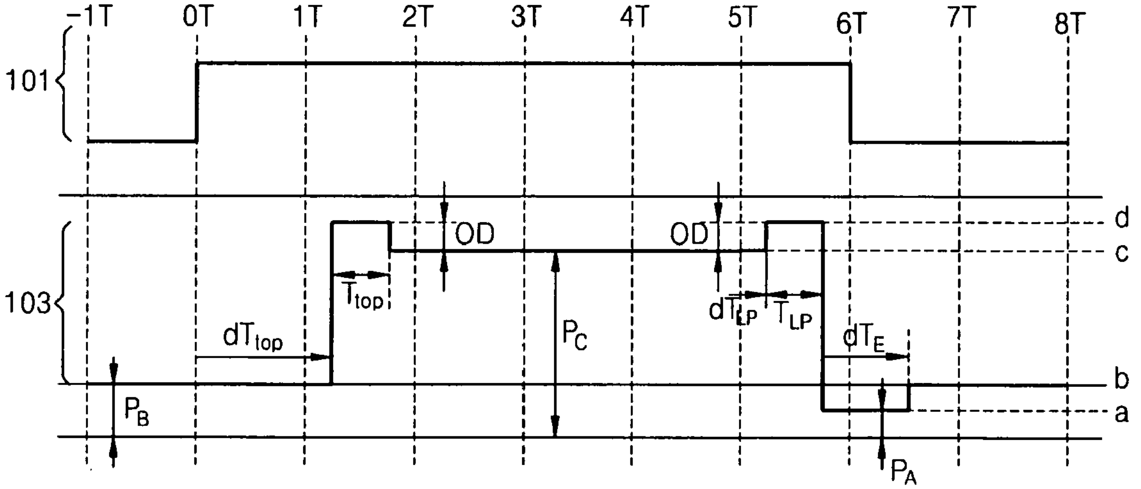
FIG. 1A illustrates write strategy parameters and a type of laser diode pulse which are used for a compact disc-recordable (CD-R), a digital video disc-recordable (DVD-R), or an organic blue-ray disc-recordable (BD-R)
Figure 1B:
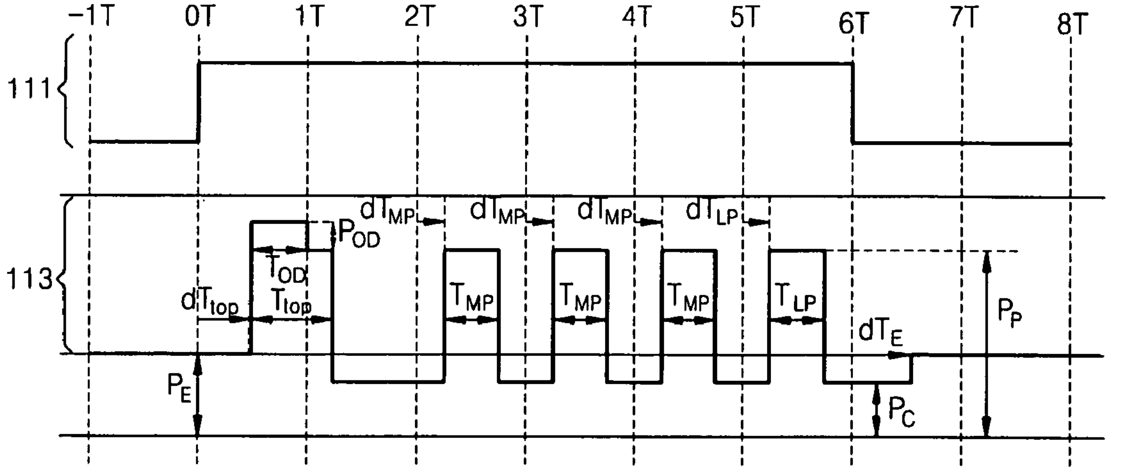
FIG. 1B illustrates write strategy parameters and a type of laser diode pulse which are used for a compact disc-rewritable (CD-RW) high speed (HS)/low speed (LS), a DVD-R normal speed (NS), a BD-R, or a blue-ray disc-rewritable (BD-RW) LS.
Figure 1C:
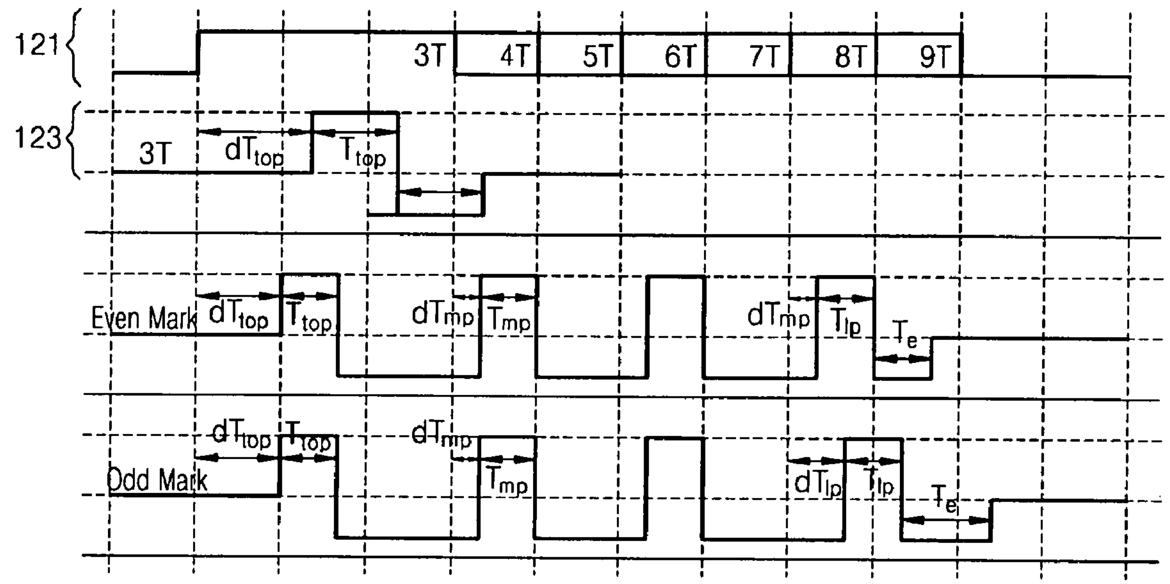
FIG. 1C illustrates write strategy parameters and a type of laser diode pulse which are used for a CD-RW ultra speed (US) or a digital video disc-rewritable (DVD-RW) HS.
Figure 1D:
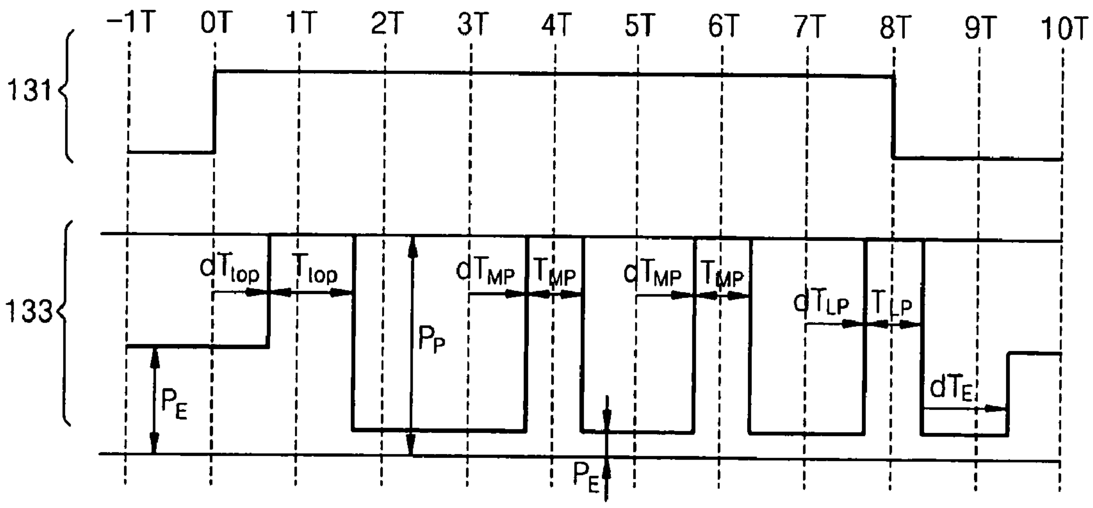
FIG. 1D illustrates write strategy parameters and a type of laser diode pulse which are used for a BD-RW HS.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 3:
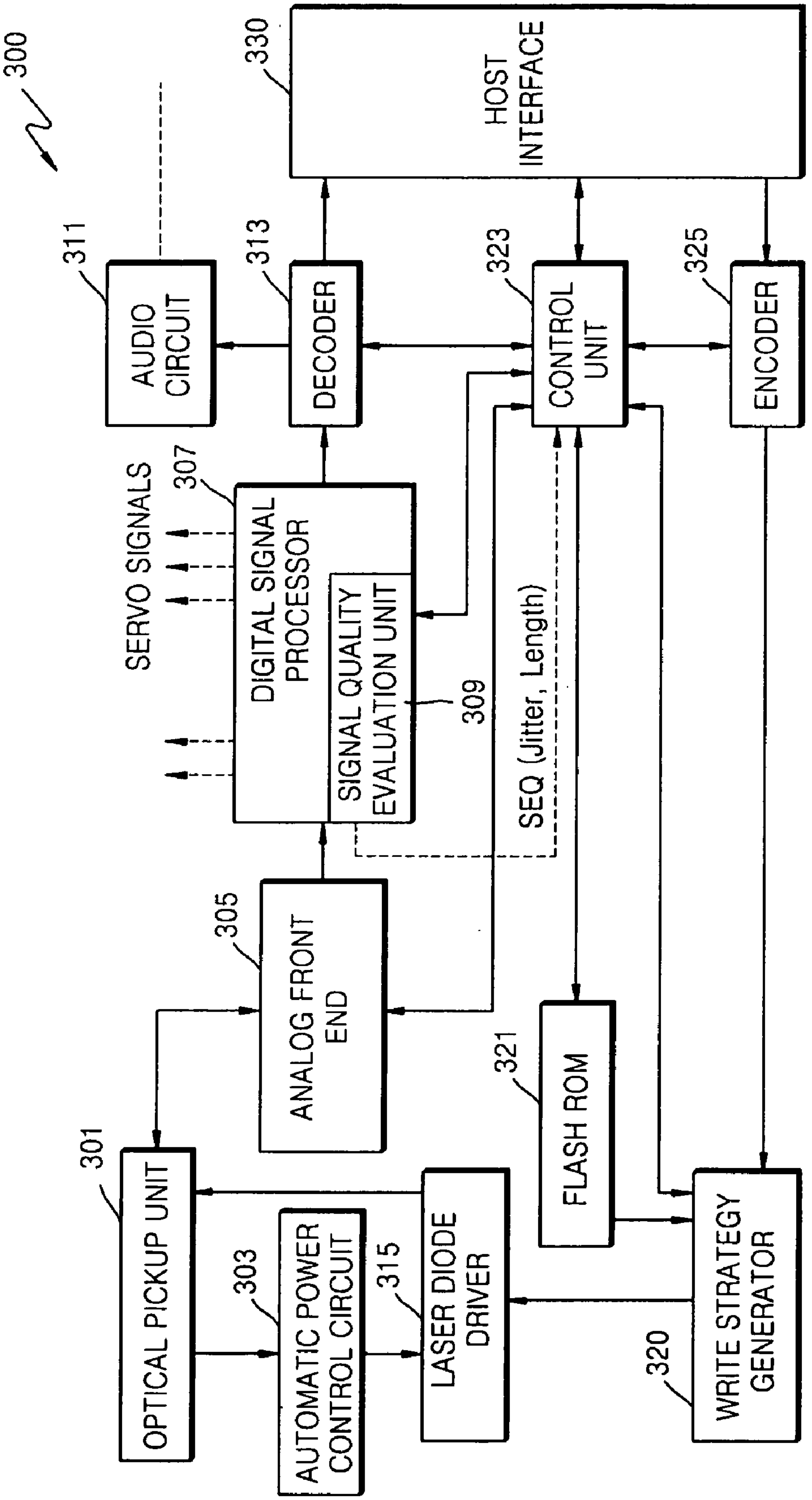
FIG. 3 illustrates an optical recording/reproducing apparatus, according to an embodiment of the present invention.

FIG. 3 illustrates an optical recording/reproducing apparatus 300, according to an embodiment of the present invention.

A structure and operation of the optical recording/reproducing apparatus 300 will now be briefly described with reference to FIG. 3.

Referring to FIG. 3, the optical recording/reproducing apparatus 300 may include a laser diode driver 315, a write strategy generator 320, an optical pickup unit 301, and an encoder 325, for example. The optical recording/reproducing apparatus 300 may further include an analog front end 305, a digital signal processor 307 including a signal quality evaluation unit 309, and a decoder 313. In addition, the optical recording/reproducing apparatus 300 may further include a host interface 330, an automatic power control circuit 303, a flash read-only memory (ROM) 321, a control unit 323, and an audio circuit 311. Here, a micro computer (MICOM) may be used as the control unit 323, and alternate embodiments with differing configurations are also available.

The host interface 330 may interface a host (not shown) with the decoder 313, or interface the host with the encoder 325. Here, as an example, a personal computer (PC) may be used as the host.

The encoder 325 can encode information data received from the host in accordance with data standards of an optical recording medium and output the encoded data. Various data standards may exist. However, hereinafter, it is assumed that the data to be stored in the optical recording medium is a non return to zero, inverted (NRZI) signal, noting that alternatives are also available.

Thus, the write strategy generator 320 may apply an optimized write strategy to the NRZI signal output from the encoder 325 and generate a corresponding tuned switching signal. Operations of such a write strategy generator 320 will be described in greater detail with reference to FIGS. 6A though 6C, 7A, 7B, and 8. Accordingly, further detailed descriptions thereof will be omitted here.

The automatic power control circuit 303 may perform automatic power control on channels of various voltage levels such as read, erase, and peak voltage levels, for example.

Here, the channels provide a plurality of different voltage levels. For example, in FIG. 1A, a writing pulse of a laser diode uses four voltage levels a, b, c, and d. In this case, the voltage levels a, b, c, and d may be respectively supplied by first through fourth channels, for example.

When data is reproduced, the laser diode driver 315 drives the laser diode so as to switch a high frequency modulated reproduction direct current (DC). When data is written, the laser diode driver 315 drives the laser diode by switching, for example, the voltage levels in channels which are output from the automatic power control circuit 303 into a designed and optimized write strategy signal, so as to form an optimized NRZI pattern on the optical recording medium.

The optical pickup unit 301 may include a laser diode for each wavelength, a plurality of passive optical devices, a plurality of photo detectors, and a plurality of passive optical device control operating devices, for example. The optical pickup unit 301 may be used as a signal sensor or a control device which is required to reproduce data stored in the optical recording medium or to write data transmitted from the host.

The analog front end 305 writes data on the optical recording medium, and then processes the written data so as to generate a radio frequency (RF) signal. The digital signal processor 307 processes the RF signal and various servo signals.

The digital signal processor 307 and the analog front end 305 will be described in greater detail with reference to FIG. 4.

The decoder 313 may then decode the RF signal, the control unit 323 may control general operations for writing and reproducing data, and the flash ROM 321 may store related data required for the write strategy.

Figure 4:
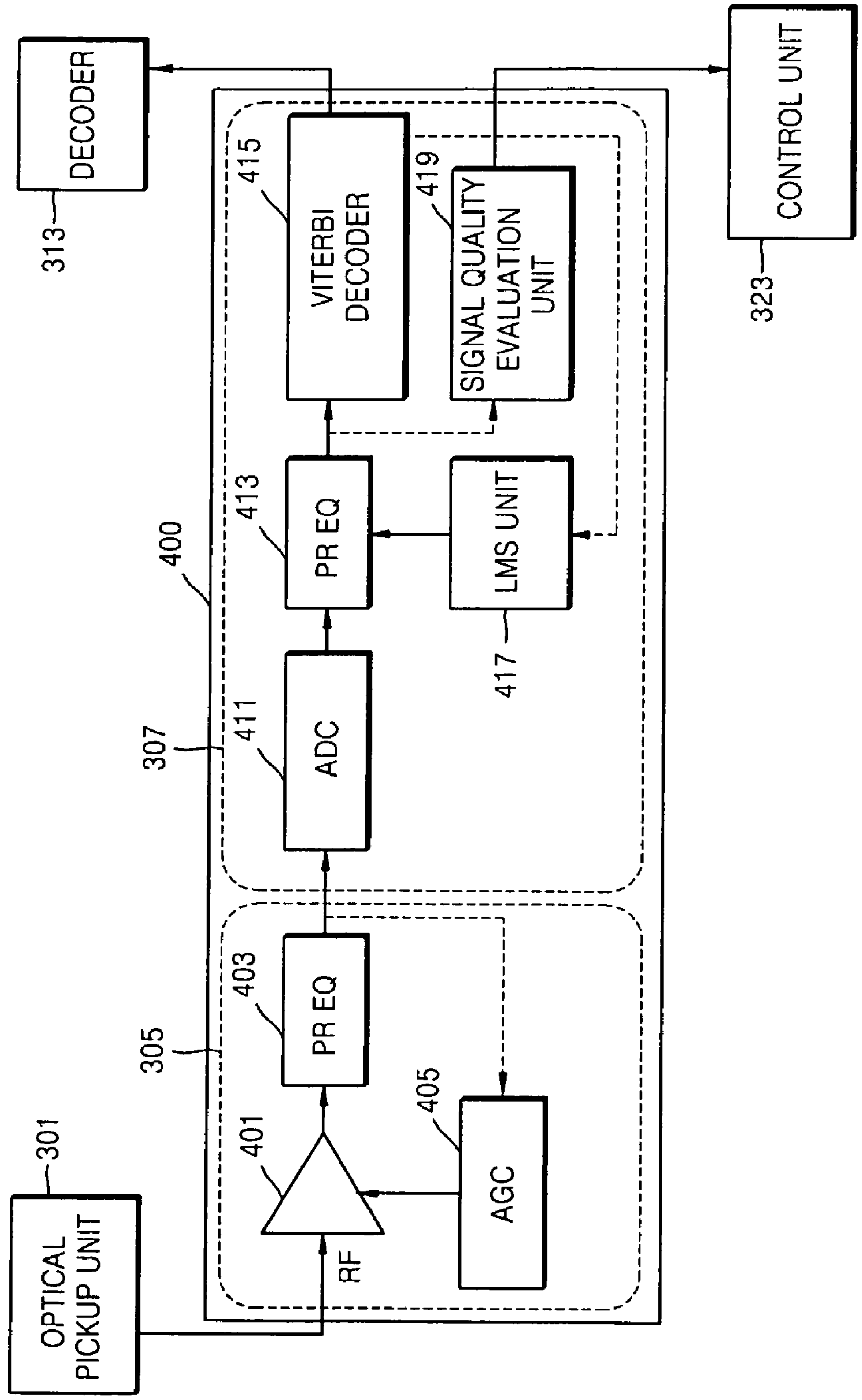
FIG. 4 illustrates an analog front end and a digital signal processor, such as those illustrated in FIG. 3, according to an embodiment of the present invention.

FIG. 4 illustrates an analog front end 305 and the digital signal processor 307, such as those illustrated in FIG. 3, according to an embodiment of the present invention.

Referring to FIG. 4, the analog front end 305 for processing an RF signal may include a voltage gain amplifier (VGA) 401, a partial response equalizer (PR EQ) 403, and an analog gain controller (AGC) 405, for example.

The digital signal processor 307 may include an analog to digital converter (ADC) 411, a PR EQ 413, a viterbi decoder 415, a least mean squares (LMS) unit 417, and a signal quality evaluation unit 419, for example.

The VGA 401 receives and amplifies an RF signal, the PR EQ 403 amplifies the RF signal so that the RF signal of each period has the same amplitude level, and the AGC 405 is coupled with the VGA 401 for automatically maintaining the RF signal to be a constant size.

In the digital signal processor 307 for processing signals in order to improve the discrimination of a short period, the ADC 411 converts the RF signal into a digital signal The PR EQ 413 amplifies the digital signal so that each period of the digital signal has the same voltage level as a corresponding period of an NRZI signal. Here, the PR EQ 413 may be a digital equalizer.

The viterbi decoder 415 decodes the digital signal by using a Hamming function so as to minimize an error rate of data to be reproduced from an optical recording medium. Here, the Hamming function uses a principal that a number 'a' of errors may be corrected if a Hamming distance 'd' between pieces of digital information is greater than or equal to '2a+1'. That is, the viterbi decoder 415 minimizes the error rate by selecting the closest code in terms of the Hamming distance.

The LMS unit 417 operates so as to maximize use of the PR EQ 413.

The signal quality evaluation unit 419 measures periodical lengths of the NRZI signal and the amount of timing jitter. The signal quality evaluation unit 419 may also measure the amount of jitter of rising and falling edges of a data signal (the NRZI signal). That is, the signal quality evaluation unit 419 may collect data that may evaluate the quality of the data signal. The collected data may then be transmitted to a data signal observation unit 693 (refer to FIG. 6C) to be described in greater detail below.

Referring back to FIG. 3, operations of the optical recording/reproducing apparatus 300 may be performed as follows.

Information output from the host pass through the host interface 330. The encoder 325 then encodes an input signal so as to generate the example NRZI signal. The write strategy generator 320 may accordingly apply an optimized write strategy to the encoded NRZI signal and generate a corresponding switching signal for each channel. Then, the laser diode driver 315 switches DC voltage levels of channels and generates a writing pulse having a corresponding optimized writing characteristic. The laser diode driver 315 uses the writing pulse so as to modulate a laser diode. The optical pickup unit 301 may, thus, then form the NRZI signal having corresponding marks and spaces on the optical recording medium, in accordance with an optical power of the modulated laser diode.

Furthermore, reproducing operations of the optical recording/reproducing apparatus 300 may further be performed as described below.

First, a reproduction DC optical power modulated with a high frequency and small amplitudes is projected toward the corresponding optical recording medium. Then, the optical pickup unit 301 generates an RF signal according to such mark and space patterns of the optical recording medium by using a diffractive optical phenomenon. The RF signal may then be amplified and standardized by passing through the analog front end 305. Then, the amplified and standardized RF signal may be converted into a square wave NRZI signal by passing through the digital signal processor 307, and then decoded by passing through the decoder 313 so as to be converted into data recognizable by the host.

Correlations between write strategy parameters and mark lengths will now be further described with reference to FIGS. 5A through 5C. Correlations between write strategy parameters and space lengths may also be used. However, for brevity purposes, correlations between write strategy parameters and mark lengths will now be exemplarily described.

Figure 5A:
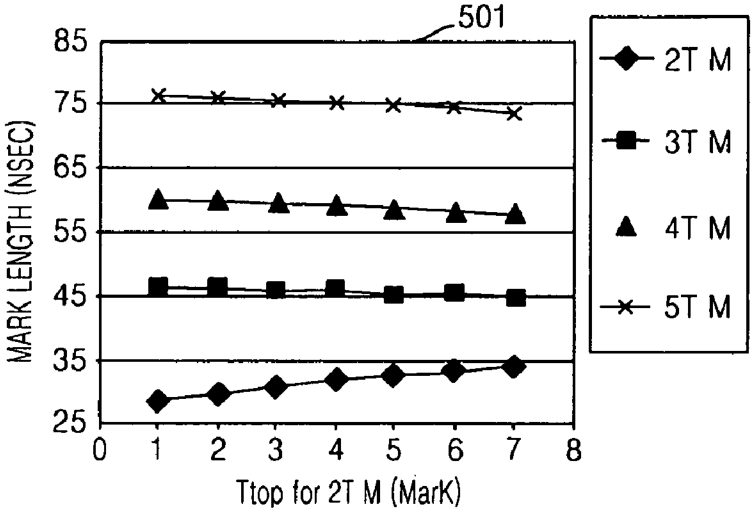
FIG. 5A graphically illustrates correlations between write strategy parameters and mark lengths, according to an embodiment of the present invention.

FIG. 5A graphically illustrates correlations between write strategy parameters and mark lengths, according to an embodiment of the present invention.

FIG. 5A illustrates variations of mark lengths 3T, 4T, and 5T when a writing operation is performed by varying a write strategy parameter, for example, Ttop, so as to increase a mark length 2T. Here, the X axis represents variations of the write strategy parameter when a mark length is 2T and the Y axis represents variations of the mark lengths 2T, 3T, 4T, and 5T.

That is, if the write strategy parameter varies so as to increase the mark length 2T, the mark length 2T is inevitably increased. In this case, the write strategy parameter applied to the mark length 2T does not influence only the mark length 2T. As illustrated in FIG. 5A, the write strategy parameter also decreases the mark lengths 3T, 4T, and 5T. That is, the write strategy parameter only applied to the mark length 2T also influences other mark lengths such as the mark lengths 3T, 4T, and 5T.

As such, the fact that a mark length mT, instead of just a mark length nT, is increased when a corresponding write strategy parameter is increased so as to increase the mark length nT, means that correlations exist between each write strategy parameter and mark lengths. If the correlations do not exist, although a write strategy parameter varies, only a corresponding mark length may vary and other mark lengths may not vary.

Herein, in embodiments of the present invention, such correlations are defined as a correlation effect.

Figure 5B:
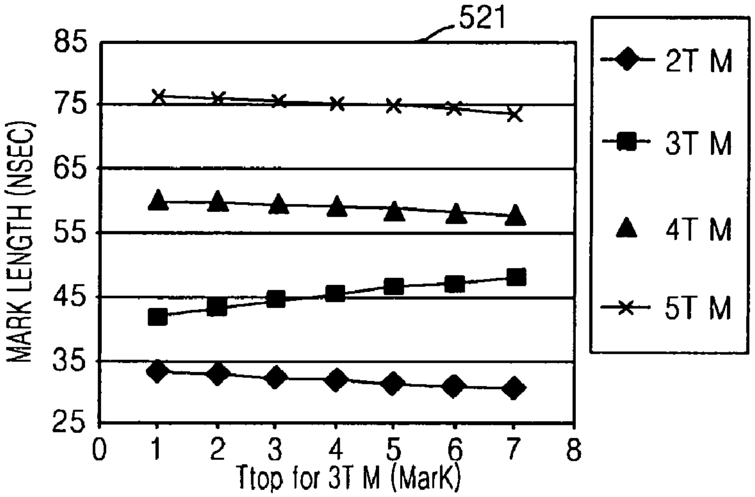
FIG. 5B graphically illustrates correlations between write strategy parameters and mark lengths, according to another embodiment of the present invention.

FIG. 5B graphically illustrates correlations between write strategy parameters and mark lengths, according to another embodiment of the present invention.

Referring to FIG. 5B, a write strategy parameter is increased so as to increase a mark length 3T. In this case, not only does the mark length 3T vary (in an increasing direction), but also mark lengths 2T, 4T, and 5T vary (in a decreasing direction).

Figure 5C:
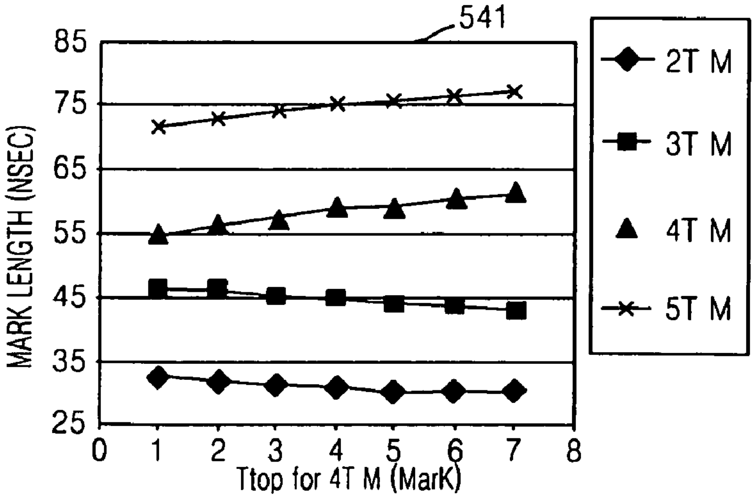
FIG. 5C graphically illustrates correlations between write strategy parameters and mark lengths, according to another embodiment of the present invention.

FIG. 5C graphically illustrates correlations between write strategy parameters and mark lengths, according to another embodiment of the present invention.

Referring to FIG. 5C, a write strategy parameter is increased so as to increase a mark length 4T. In this case, not only does the mark length 4T vary (in an increasing direction), but also mark lengths 2T, 3T, and 5T vary (in a decreasing direction for the mark lengths 2T and 3T and in an increasing direction for the mark length 5T). In FIG. 5C, although the write strategy parameter is increased so as to increase the mark length 4T, the mark length 5T is also increased. Thus, the fact that correlations exist between write strategy parameters and mark lengths becomes more evident.

As described above in relation to FIGS. 5A through 5C, embodiments of the present invention consider a resultant determination that a correlation effect occurs between write strategy parameters and mark lengths and thus provides an optimized write strategy method, medium, and apparatus, including a corresponding an optical recording/reproducing apparatus, by removing these correlation effects. Such optimized write strategies will be described in greater detail below with reference to FIGS. 6A though 6C, 7A, 7B, and 8.

Figure 5D:
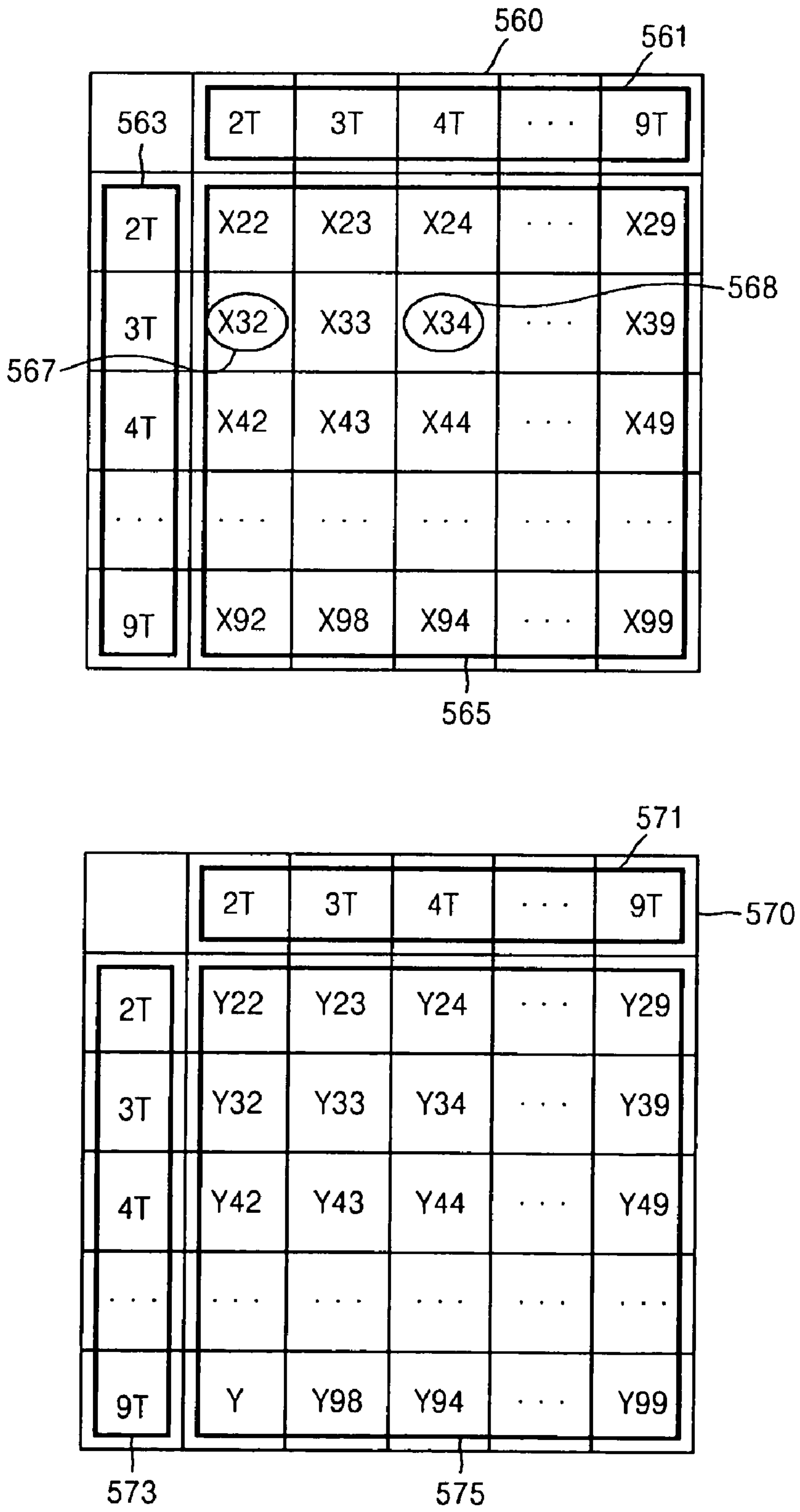
FIG. 5D illustrates correlations between previous signal periods and current signal periods, according to an embodiment of the present invention.

FIG. 5D illustrates, through tables 560 and 570, determined correlations between previous signal periods and current signal periods, according to an embodiment of the present invention.

Referring to FIG. 5D, table 560 represents write strategy parameters in accordance with mark lengths and table 570 represents write strategy parameters in accordance with space lengths.

In table 560, the reference numeral 561 represents current mark lengths, the reference numeral 563 represents previous mark lengths, and the reference numeral 565 represents write strategy parameters. For example, the reference numeral 567 represents a write strategy parameter X32 when a previous mark length is 3T and a current mark length is 2T. The reference numeral 568 represents a write strategy parameter X34 that is applied to the current mark length 4T when the previous mark length is 3T and the current mark length is 4T. That is, when a previous mark length is aT and a current mark length is bT, Xab represents a write strategy parameter which is applied to the current mark length bT and is influenced by the previous mark length aT.

The table 570 represents write strategy parameters in accordance with space lengths and detailed descriptions of the table 570 correspond to the description of the table 560. That is, when a previous space length is aT and a current space length is bT, Yab represents a write strategy parameter that is applied to the current space length bT and is influenced by the previous mark length aT.

As described above, according to FIG. 5D, the write strategy parameters may be calculated in consideration of the above-described correlation effect in relation to FIGS. 5A through 5C.

Figure 6A:
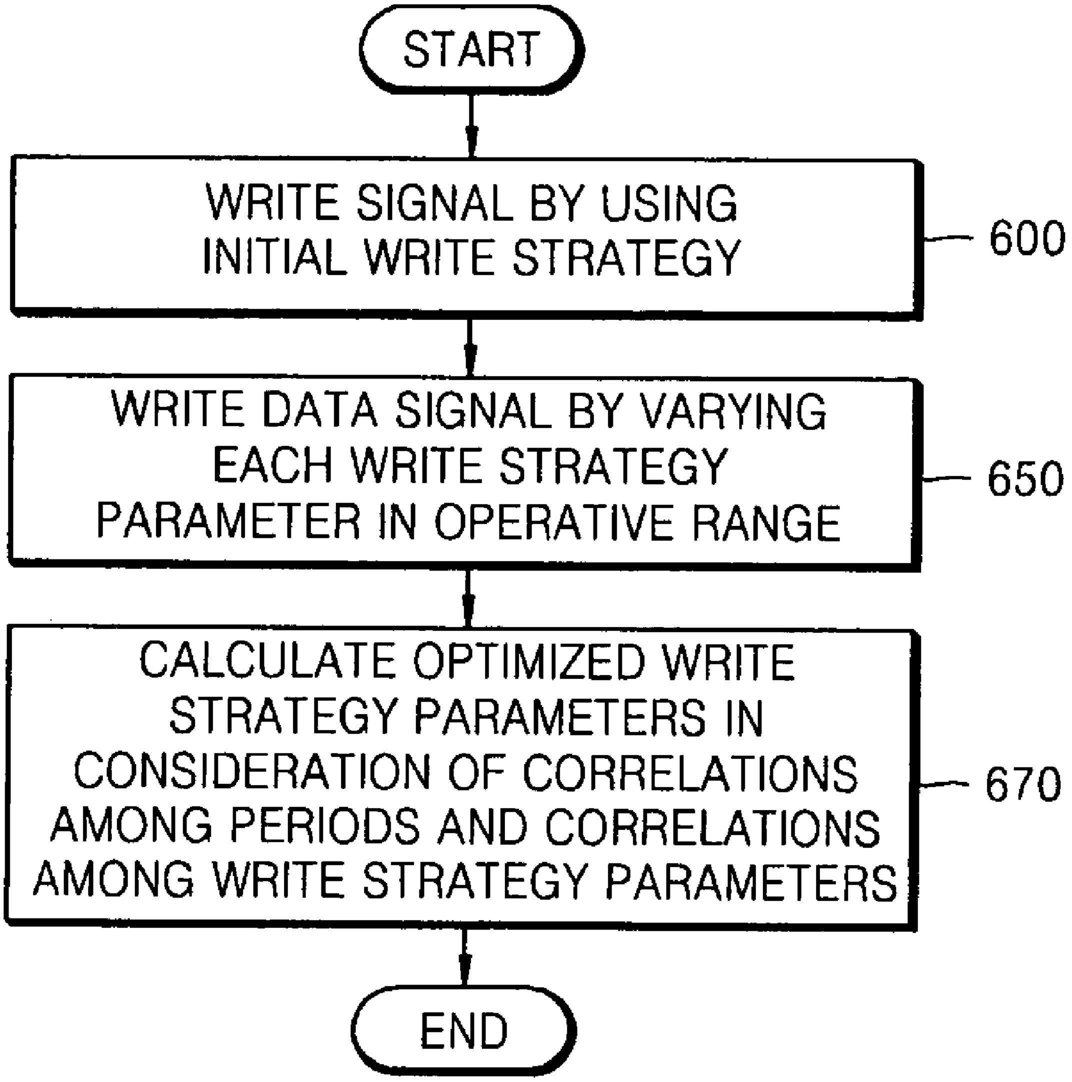
FIG. 6A illustrates a write strategy method, according to an embodiment of the present invention.

FIG. 6A illustrates a write strategy method, according to an embodiment of the present invention.

Referring to FIG. 6A, a signal is written to the corresponding medium by using an initial write strategy, in operation 600. Here, the signal is written by using power having a predetermined value. In an embodiment, the initial write strategy may be a default write strategy that may be applied to any optical recording medium.

The data signal is written by varying each write strategy parameter in a predetermined range, in operation 650. Here, in an embodiment, operation 650 is performed if the quality of the signal written in operation 600 is determined to be of an unacceptable quality level, for example.

The write strategy parameters may be calculated in consideration of the calculated correlations among periods of the data signal and calculated correlations among write strategy parameters, in operation 670. In operation 670, the write strategy parameters may be calculated in consideration of the correlations among the periods of the data signal and the correlations among the write strategy parameters by measuring and using variations of the data signal written in operation 650.

A method for a write strategy and an optical recording/reproducing apparatus implementing the same, according to an embodiment the present invention, will now be described in greater detail with reference to FIGS. 6B and 6C.

Figure 6B:
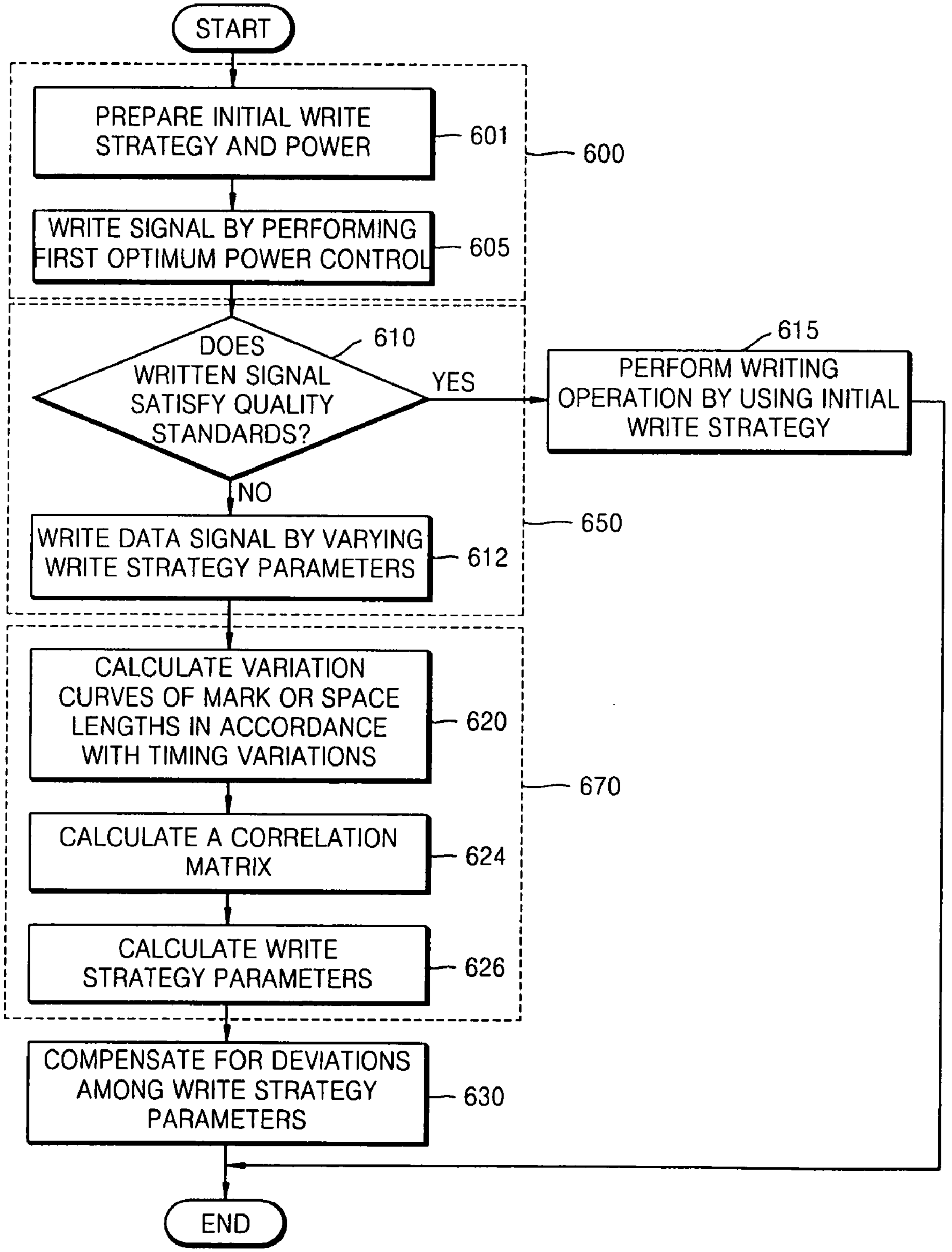
FIG. 6B illustrates a method such as FIG. 6A with greater detail, according to an embodiment of the present invention.

FIG. 6B illustrates a method such as FIG. 6A, according to an embodiment of the present invention. FIG. 6C illustrates a write strategy generator 320, such as illustrated in FIG. 3, according to an embodiment of the present invention.

Referring to FIG. 6B, operations 600, 650, and 670 of FIG. 6A, for example, respectively include operations 601 and 605, operations 610 and 612, and operations 620, 624, and 626. In an embodiment, the method of FIG. 6A may further include operations 615 and 630, for example.

Here, an initial write strategy and corresponding power may be prepared in operation 601. As described above in relation to FIG. 6A, the initial write strategy may be a default write strategy that has been initially set, for example. The default write strategy may be generally applied to an optical recording medium. The power may further be from a current source having voltage levels to be used in such an initial write strategy.

In accordance with the initial write strategy, the signal is written to the corresponding medium by performing first optimum power control, in operation 605. Optimum power control may be performed by optimizing and thus controlling the power. That is, when a transmitted signal is written by using predetermined power, the optimum power control may be performed by searching for a power value that allows the signal to have an optimized writing quality.

A power level applied to perform the first optimum power control may be determined and a corresponding data signal written by using the determined power level.

Figure 6C:
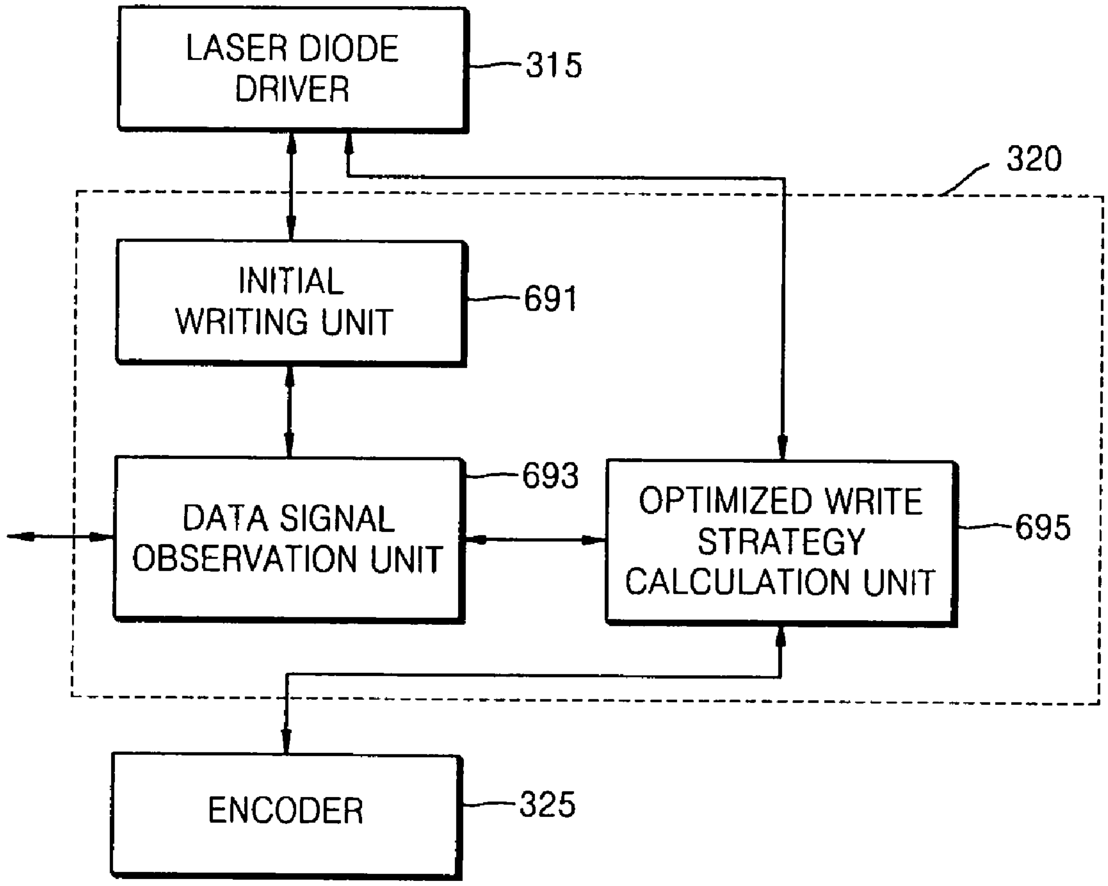
FIG. 6C illustrates a write strategy generator, such as that of FIG. 3, according to an embodiment of the present invention.

With brief reference to FIG. 6C, such operations 601 and 605 may be performed by an initial writing unit 691 in the write strategy generator 320, for example.

It may then be determined whether the quality of the signal written in operation 605 is low, or not of a sufficiently high level, in operation 610.

Here, as only an example, the quality of the written signal may be determined in accordance with the amount of timing jitter of a signal pattern, the amount of jitter of rising and falling edges, absolute lengths of marks and spaces (for example, accuracies of written mark lengths in comparison with target mark lengths), an error rate that is determined when the written signal is decoded, the quality of restored data, or the possibility of restoring of the written data (how completely the written signal is restored by performing, for example, error correction). For example, when a user sets an allowable amount of jitter for reading the signal to be 10%, if the amount of jitter of the written signal is equal to or less than 10%, the quality of the written signal is determined to be sufficiently high. If the amount of jitter of the written signal is greater than 10%, the quality of the written signal is determined to be low.

In one or more embodiments of the present invention, allowable ranges for the amount of timing jitter of a signal pattern, the amount of jitter of rising and falling edges, absolute lengths of marks and spaces (for example, accuracies of written mark lengths in comparison with target mark lengths), an error rate that is extracted when the written signal is decoded, the quality of restored data, or the possibility of restoring of the written data (how completely the written signal is restored by performing, for example, error correction) are regarded may be initial quality standards. That is, if the above-described initial quality standards are satisfied, a writing quality may be determined to be high.

If the quality of the written signal is determined to be high in operation 610, further writing operations may be performed on the optical recording medium by using the initial write strategy such as the default write strategy in operation 615. Operation 615 may further be performed by a write strategy executor (not shown) in the write strategy generator 320 of FIG. 6C.

Alternatively, the data signal may be written by varying each write strategy parameter in an operative range, in operation 612.

With further brief reference to FIG. 6C, operations 610 and 612 may be performed by a data signal observation unit 693 in the write strategy generator 320, for example. Here, the quality of the written signal may be determined by using data regarding a signal quality which is transmitted from the signal quality evaluation unit 309 illustrated in FIG. 3. The quality of the written signal may also be determined by using data errors and restored data of the decoder 313 illustrated in FIG. 3.

In addition, operations 610 and 612 may be performed by the data signal observation unit 693 that automatically receives the data regarding the signal quality and evaluates the quality of the written signal. That is, the data signal observation unit 693 may receive the data regarding the signal quality from the signal quality evaluation unit 309 and determine the quality of the written data by using the received data. According to an embodiment, if the quality of the written signal is low, the data signal observation unit 693 may, thus, automatically perform operation 612.

Variation curves of mark or space lengths in accordance with timing variations may further be calculated in operation 620. Variations of mark lengths or variations of space lengths are observed by varying each write strategy parameter. Results of observations may be written and stored in the write strategy generator 320. Here, the timing variations are timing values of the write strategy parameters. Accordingly, the variations of the mark or space lengths may be observed by varying each write strategy parameter on a time axis. The variation curves may, thus, be calculated by using data regarding the variations of the mark or space lengths in accordance with deviations of the write strategy parameters.

Here, the variation curves of the data signal may be calculated on each of all mark lengths, such as 2T, 3T, 4T, through to 9T. In addition, as described above in relation to FIGS. 5A through 5D, the variation curves of the mark lengths may be separately calculated in consideration of previous pattern periods and current pattern periods. That is, if a mark length of a previous pattern is jT and a mark length of a current pattern is iT, a variation curve may be calculated by varying values of i and j.

The variation curves of the data signal may also be calculated on each of all space lengths, such as 2T, 3T, 4T, through to 9T.

A variation curve of a mark length will now be described in detail with reference to FIG. 7A. The variation curve may also be applied to a space length.

Figure 7A:
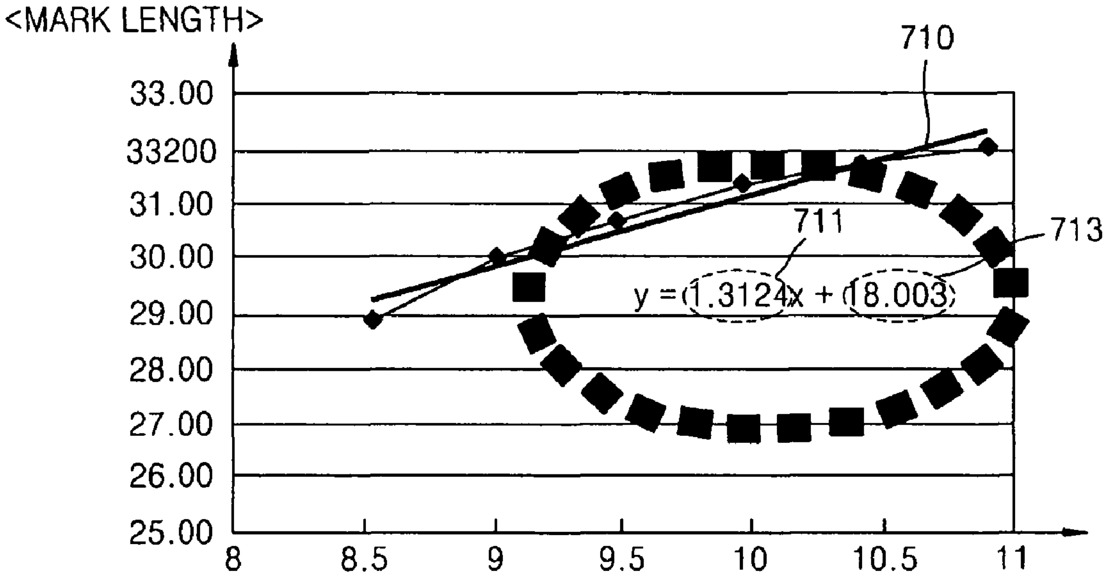
FIG. 7A graphically illustrates a variation curve of a mark length as a timing write strategy parameter varies, according to an embodiment of the present invention.

FIG. 7A graphically illustrates a variation curve of a mark length as a timing write strategy parameter varies, according to an embodiment of the present invention.

The variation curve of the mark length shows variations of a corresponding mark length as a timing parameter from among write strategy parameters. Accordingly, the X axis represents the corresponding write strategy parameter and the Y axis represents the mark length. Here, a write strategy parameter $dT_E$ that is applied to a mark length 2T will be exemplarily described.

According to this embodiment, the variation curve of the mark length will be exemplarily described. However, a variation curve of a space length may also be used. That is, the variation curve of the space length which represents variations of the space length in accordance with variations of a write strategy parameter (particularly, a timing parameter) may also be used. Furthermore, the variation curves of the mark length and the space length may be used together.

Referring to FIG. 7A, as the write strategy parameter is increased, the mark length is also increased. The variation curve is represented as a straight line type and thus may be represented by using a linear equation, for example. Accordingly, the slope and a y-intercept may be calculated by analyzing the calculated variation curve of the mark length (or the space length). Herein, the slope is defined as a change ratio.

In FIG. 7A, a change ratio 711 of a straight line 710 is 1.3124 and a y-intercept 713 is 18.003.

Figure 7B:
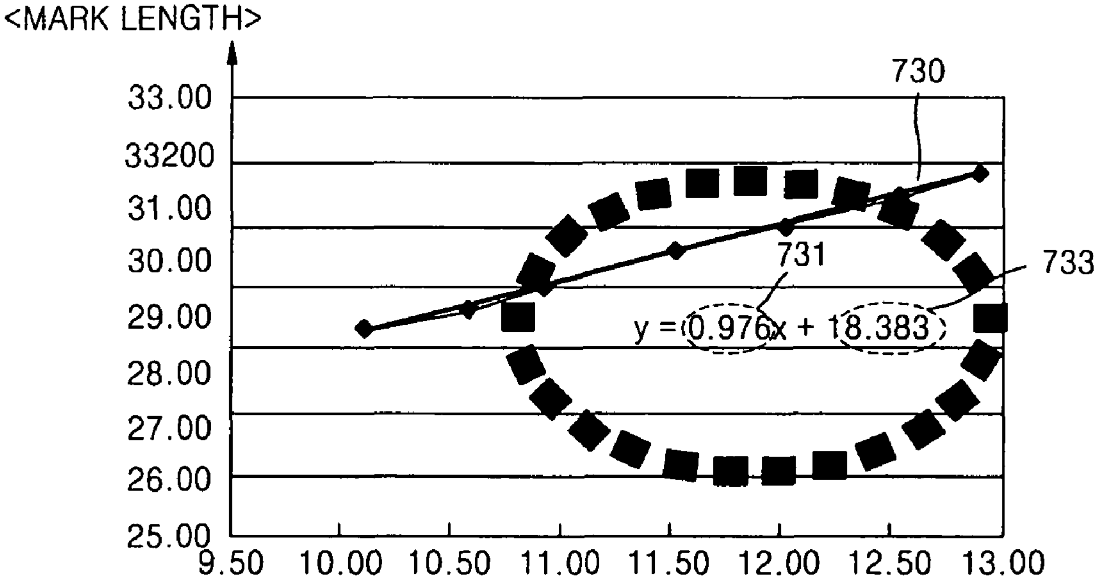
FIG. 7B graphically illustrates a variation curve of a mark length as a timing write strategy parameter varies, according to another embodiment of the present invention.

FIG. 7B graphically illustrates a variation curve of a mark length as a timing write strategy parameter varies, according to another embodiment of the present invention.

Referring to FIG. 7B, variations of a mark length 2T in accordance with variations of a write strategy parameter $dT_E$ that is applied to the mark length 2T are exemplarily illustrated.

FIG. 7B illustrates a case when a write strategy is performed by using the same model of optical recording medium as the optical recording medium used in FIG. 7A. However, different initial write strategies, such as default write strategies, are applied to FIGS. 7A and 7B.

If the default write strategies are different from each other, although the same write strategy parameter varies or is controlled, the same variation curve may not be obtained. If the default write strategies are different from each other, although the same write strategy parameter such as the write strategy parameter $dT_E$ varies, different variation curves are obtained due to correlations of other write strategy parameters.

Accordingly, although the mark length is extracted by varying the same write strategy parameter $dT_E$ in FIGS. 7A and 7B, slopes and y-intercepts of straight lines 710 and 730 are different to each other.

As such, it is clear that optimized write strategy parameters may not be easily obtained due to correlations among write strategy parameters even when a write strategy is executed on the same model of optical recording medium. Likewise, it may be construed that a previously designed and optimized write strategy parameters may vary in a different manner according to deviations between optical recording media or deviations between optical recording/reproducing apparatuses. Here, set deviations between optical recording/reproducing apparatuses means that writing conditions of the same product group may vary due to optical deviations of an optical pickup unit (OPU) and differences in types of optical spot or depths of focus.

In addition, the write strategy may be influenced by a writing environment. Here, variations of the writing environment means that an external environment varies due to variations of temperature or humidity, for example, at a point of writing.

Based on the above-described media variations, set variations, and environmental variations, it may be determined that an optimized write strategy should be changed.

Thus, in an embodiment, subsequent operations may be performed by separately calculating a variation curve of a written data signal, such as the variation curves illustrated in FIGS. 7A and 7B, with regard to each of all available combinations of write strategy parameters of an optical recording medium. By separately calculating the variation curve, the above-described media variations, set variations, and environment variations, which occur on the optical recording medium, may be determined so that the optimized write strategy may be designed.

Referring back to FIGS. 6B and 6C, a correlation matrix may, thus, be calculated by using the variation curves of the data signal, calculated in operation 620, in operation 624. For example, the below Equation 1 is a matrix for calculating write strategy parameters. The matrix of Equation 1 is calculated by using the variation curves of the data signal, which are calculated in operation 620.

$$\underset{①}{\begin{bmatrix} M\_A2 \\ M\_A3 \\ M\_A4 \\ \backslash \end{bmatrix}} = \underset{②}{\begin{bmatrix} a\_22 & a\_23 & a\_24 & \backslash \\ a\_32 & a\_33 & a\_34 & \backslash \\ a\_42 & a\_43 & a\_44 & \backslash \\ \backslash & \backslash & \backslash & \backslash \end{bmatrix}} \underset{③}{\begin{bmatrix} A\_2 \\ A\_3 \\ A\_4 \\ \backslash \end{bmatrix}} + \underset{④}{\begin{bmatrix} K\_A2 \\ K\_A3 \\ K\_A4 \\ \backslash \end{bmatrix}} \quad \text{Equation 1}$$

-continued $$\underbrace{\begin{bmatrix} M\_G2 \\ M\_G3 \\ M\_G4 \\ \vdots \end{bmatrix}}_{①'} = \underbrace{\begin{bmatrix} g\_22 & g\_23 & g\_24 & \ddots \\ g\_32 & g\_33 & g\_34 & \ddots \\ g\_42 & g\_43 & g\_44 & \ddots \\ \ddots & \ddots & \ddots & \ddots \end{bmatrix}}_{②'} \underbrace{\begin{bmatrix} G\_2 \\ G\_3 \\ G\_4 \\ \vdots \end{bmatrix}}_{③'} + \underbrace{\begin{bmatrix} K\_G2 \\ K\_G3 \\ K\_G4 \\ \vdots \end{bmatrix}}_{④'}$$

Here, M_Ak of functions ① represents a mark length when a current mark length is kT, a_ij of functions ② represents a change ratio (corresponding to the slope illustrated in FIGS. 7A and 7B) when a current mark length is iT and a previous mark length is jT, A_k of functions ③ represents a corresponding write strategy parameter when a mark length is kT, and K_Ak of functions ④ represents a y-intercept (corresponding to the y-intercepts of the variation curves illustrated in FIGS. 7A and 7B). The y-intercept K_Ak is a linear sum of y-intercepts of all previous data signals having mark lengths 2T through mT.

The write strategy parameters may, thus, be calculated in consideration of correlations among periods of the data signal and correlations among the write strategy parameters, in operation 625.

By using Equation 1, the write strategy parameters may be calculated in consideration of the correlations among the write strategy parameters and the correlations among the periods (marks and spaces) of the data signal, which are described above in relation to FIGS. 5A through 5D, 7A, and 7B.

Here, again, the correlations among the write strategy parameters mean that a certain write strategy parameter may influence other write strategy parameters, as described above in relation to FIGS. 7A and 7B. The variation curves may be calculated by varying each write strategy parameter in operation 620. Thus, the correlations among the write strategy parameters may be reflected.

The correlations among the periods of the data signal mean that previous mark lengths (or space lengths) influence current mark lengths (or space lengths), as described above in relation to FIGS. 5A through 5D. In functions ② of Equation 1, a slope and a y-intercept are calculated by reflecting previous mark lengths and current mark lengths. Thus, Equation 1 may reflect the correlations among the periods of the data signal.

The write strategy parameters may further be calculated by using the correlation matrix calculated in operation 624, in operation 625. The write strategy parameters may be calculated by inversely performing functions ③ of Equation 1. By moving functions ④ to the right of Equation 1 and forming an inverse matrix of functions ②, write strategy parameters of functions ③ may be calculated.

G_k of functions ③' is another write strategy parameter. For example, if A_k is $T_{top}$ when a mark length is kT, G_k may be $dT_E$ when the mark length is kT.

Deviations of the write strategy parameters may further be compensated for, in operation 630.

In operations 624 and 626, each write strategy parameter may, thus, be calculated by varying the write strategy parameter and maintaining the other write strategy parameters as they are. Accordingly, the correlations among the write strategy parameters remain.

In order to remove the correlations from among the write strategy parameters, the write strategy parameters may be calculated by repeating operations 624 and 626 several times. Then, in consideration of the deviations of the write strategy parameters which are repeatedly calculated, write strategy parameters having minimum error deviations are selected.

Again with brief reference to FIG. 6C, operations 620, 624, 626, and 630 may be performed by an optimized write strategy calculation unit 695 in the write strategy generator 320, for example.

Accordingly, optimized write strategy parameters may be calculated by performing the operations described above in relation to FIGS. 6A through 6C.

Figure 8:
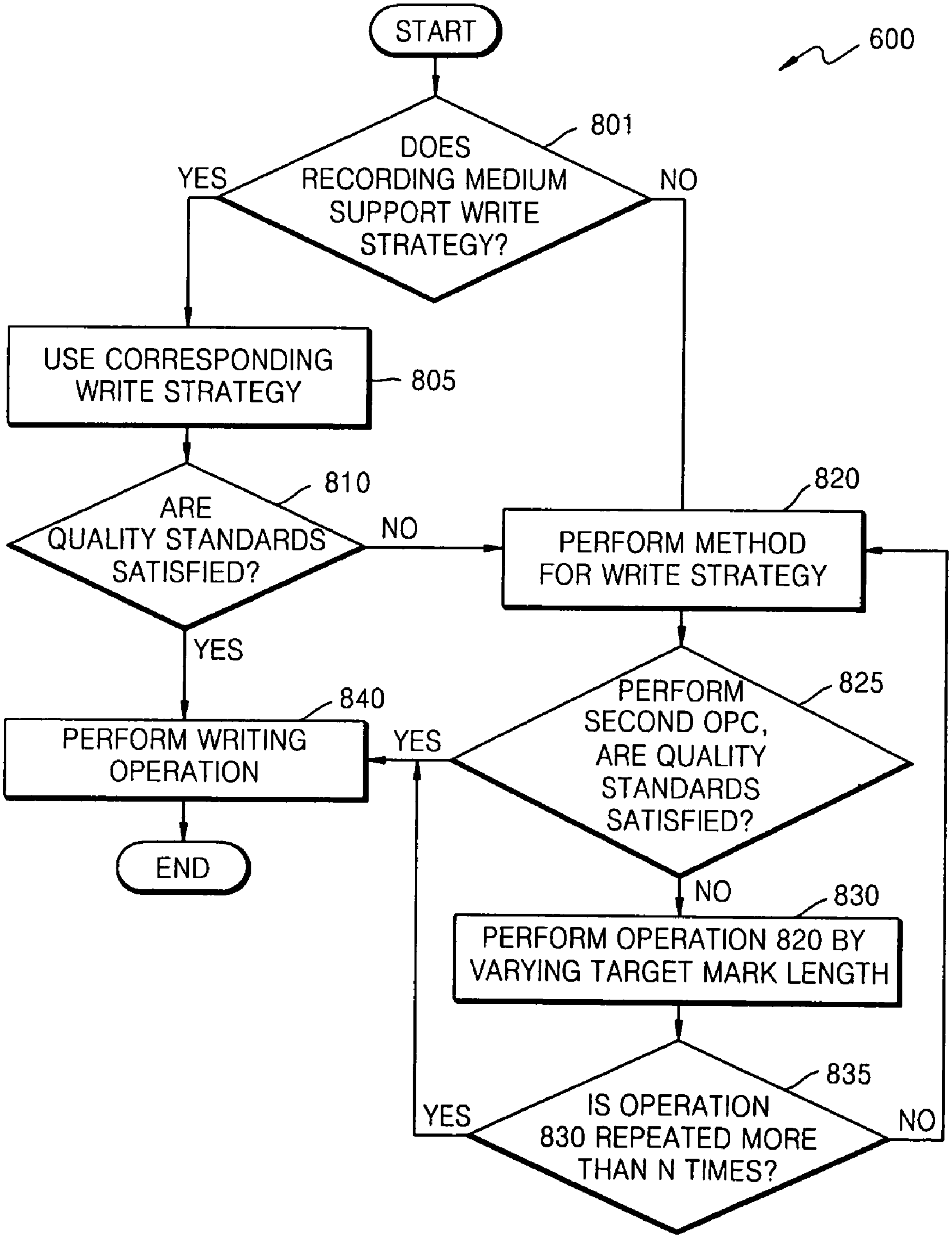
FIG. 8 illustrates a write strategy method, according to another embodiment of the present invention.

FIG. 8 illustrates a write strategy method, according to another embodiment of the present invention.

Referring to FIG. 8, it may be determined whether an optical recording/reproducing apparatus supports a write strategy optimized for a corresponding optical recording medium, in operation 801.

Figure 2:
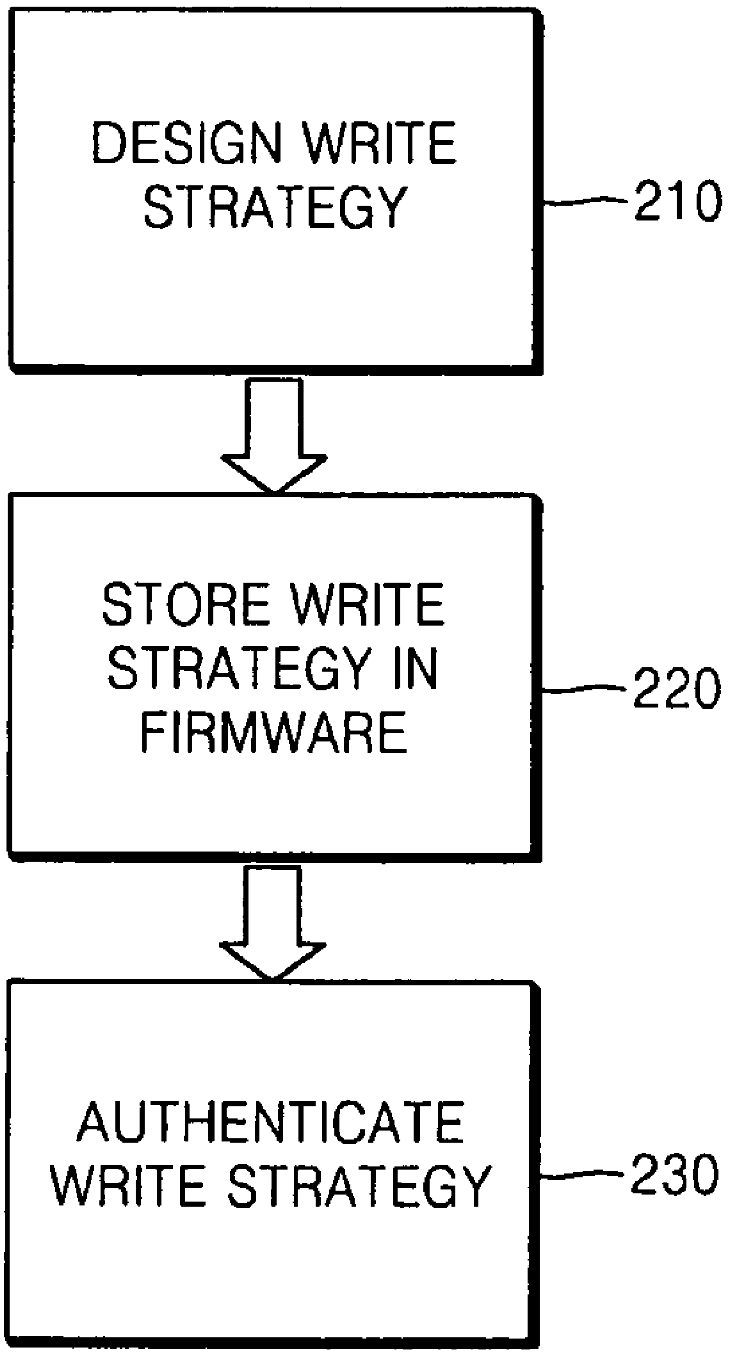
FIG. 2 illustrates a conventional method of designing, storing, and authenticating a write strategy for an optical recording medium.

As described above in relation to FIGS. 1 and 2, the optical recording/reproducing apparatus may store and/or support the write strategy optimized for the corresponding optical recording medium. As such, it may be determined whether a certain optical recording/reproducing apparatus recognizes a corresponding optical recording medium and supports a write strategy optimized for the optical recording medium. That is, it may be determined whether the optical recording/reproducing apparatus includes the write strategy optimized for the optical recording medium.

If it is determined that the optical recording medium is supported by the optimized write strategy in operation 801, first optimum power control may be performed by using an initial write strategy that has been previously designed and is supported by the optical recording/reproducing apparatus, in operation 805.

It is then determined whether a written signal, e.g., by performing the first optimum power control in operation 805, satisfies initial quality standards, in operation 810. Whether the written signal satisfies the initial quality standards may be performed in accordance with how accurately a data signal such as a NPZI signal to be written is written or read to/from the corresponding medium. The determining of whether the written signal satisfies the initial quality standards may correspond to operation 610 illustrated in FIG. 6B.

If it is determined that the written signal satisfies the initial quality standards in operation 805, further writing operations may be performed by using the previously designed corresponding write strategy, in operation 840.

If it is determined that the optical recording medium is not supported by the optimized write strategy in operation 801, the write strategy method illustrated in FIGS. 6A and 6B, for example, may be performed, in operation 820.

After operation 820 is performed, second optimum power control may then be additionally performed and it may be determined whether a corresponding written signal, e.g., by performing the second optimum power control, satisfies the initial quality standards, in operation 825.

If it is determined that the written signal, e.g., by performing the second optimum power control, satisfies the initial quality standards in operation 825, the method may proceed to operation 840 and further writing operations performed.

If it is determined that the written signal, e.g., by performing the second optimum power control, does not satisfy the initial quality standards in operation 825, operation 820 may then be repeated by varying a target mark length, in operation 830.

That is, solutions (optimized write strategy parameters) of inverse functions of the correlation matrix of Equation 1 may be calculated by increasing or decreasing the target mark length.

Quality characteristics of the data signal which are obtained (reproduced) by repeating operation 820 may further be evaluated and write strategy parameters having the best writing qualities selected.

Here, for example, it may be determined whether a written data signal satisfies the quality standards in accordance with an error rate of error correction coded (ECC) data or error detection coded (EDC) data. Such a determining may correspond to the description operation 610 illustrated in FIG. 6B. For example, write strategy parameters having minimum amounts of timing jitter may be selected by checking variations of the amount of timing jitter.

It may still further be determined whether operation 830 is repeated more than n times in operation 835.

Here, n is determined in accordance with the quality of the reproduced data signal. With regard to the above-described correlations among the write strategy parameters, n is determined in such a manner that deviations among the write strategy parameters may be saturated to certain amounts. For example, if the deviations among the write strategy parameters are saturated when operation 830 is repeated five times, n may be determined to be five.

If operation 830 is repeated more than n times, the method may proceed to operation 840 and further writing operations performed.

If operation 830 is not repeated more than n times, the method returns to operation 820.

Figure 9A:
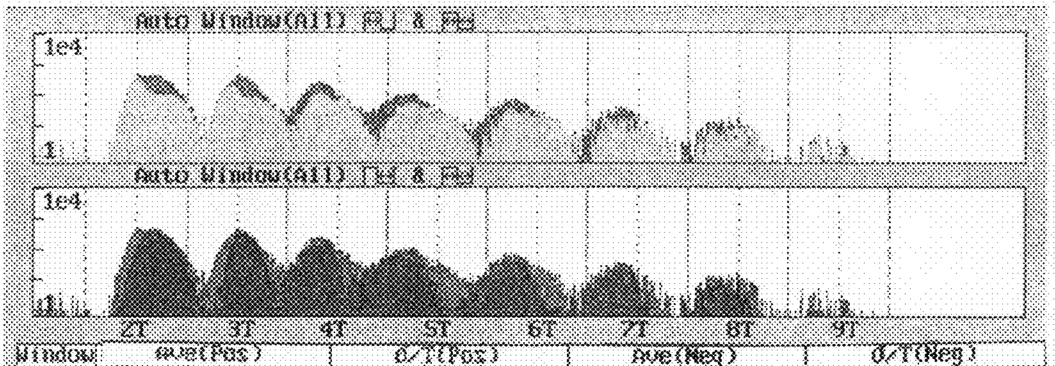
FIG. 9A illustrates a histogram of a radio frequency (RF) signal, divided according to periods.

FIG. 9A illustrates a histogram of an RF signal divided according to periods, in a conventional write strategy method.

In the conventional method, if an optical recording medium is not supported by an optimized write strategy, if set deviations exist, or if a writing environment changes, the optimized write strategy may not be executed.

Referring to FIG. 9A, the RF signal is distributed in broad ranges and overlapping regions exist. For example, an overlapping region exists between distribution graphs of mark lengths 2T and 3T. As such, write strategy parameters have larger errors in the overlapping regions.

Referring to a table illustrated below the histogram of FIG. 9A, the minimum value of $\sigma/T$ (standard variation versus period) is 16.192769% so as to have large variations. That is, the timing jitter is greater than 16.19%.

Figure 9B:
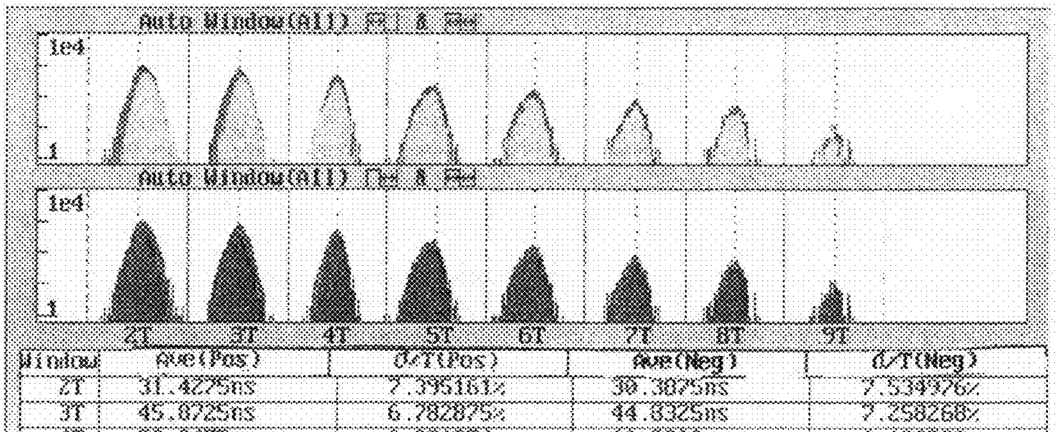
FIG. 9B illustrates a histogram of an RF signal, divided according to periods, in a write strategy method, according to an embodiment of the present invention.

FIG. 9B illustrates a histogram of an RF signal divided according to periods, in a write strategy method according to an embodiment of the present invention.

Referring to FIG. 9B, the RF signal is distributed in relatively narrow ranges compared to FIG. 9A. Also, an overlapping region does not exist between a current mark length nT and a neighboring mark length (n+1)T.

Referring to a table illustrated below the histogram of FIG. 9B, values of $\sigma/T$ are approximately 7%. That is, the method according to this embodiment has an amount of timing jitter which is reduced by more than 7% compared to the amount of timing jitter of the conventional method.

As described above, according to one or more embodiments of the present invention, by measuring and evaluating writing characteristics of several to all available combinations of write strategy parameters, optimized write strategy parameters may be obtained. Thus, an error rate of a write strategy can be minimized so that time for redesigning the write strategy may be reduced.

Deviations of an optimized write strategy, which occur in the same model of optical disk drive, may be solved and an error rate of set evaluations, which relates to a writing quality, may be reduced when the optimized write strategy is developed.

An optimized write strategy may also be automatically designed in a new optical disk drive having an unknown write strategy. Thus, an optimum writing quality may be maintained without having to upgrade firmware and the cost for upgrading the firmware may be reduced.

Although a writing characteristic varies due to variations of an environment such as temperature and humidity at a point of writing, an optimized write strategy may also be designed so as to cope with the variations.

Correlations among marks or spaces and correlations among write strategy parameters may be minimized so that a writing quality of a data signal may be improved.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or controlling carrier waves as well as elements of the Internet, for example. Thus, the medium may be such a defined and measurable structure carrying or controlling a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of generating and providing a write strategy, the method comprising:

writing a signal to a storage medium using a predetermined power and an initial write strategy;

calculating variation characteristics of a data signal, read from the storage medium, which separately correspond to variations of write strategy parameters, if the written signal, as read from the storage medium, does not satisfy defined quality standards; and calculating correlations among periods of the data signal and correlations among the write strategy parameters using the variation characteristics of the data signal, and determining corresponding write strategy parameters for a write strategy for subsequent writing to the storage medium based on the calculated correlations among the periods of the data signal and the calculated correlations among the write strategy parameters.

2. The method of claim 1, wherein the determining of the write strategy parameters comprises:

calculating, from the data signal, variation curves of mark and/or space lengths in accordance with timing variations; and calculating the determined write strategy parameters using the variation curves.

3. The method of claim 2, wherein whether the written signal satisfies the defined quality standards is determined based on a determined amount of timing jitter of the written signal, amount of jitter of rising and falling edges of the written signal, data error that is extracted from the written signal, or determination whether an error occurs due to restored data in which the data error is restored.

4. The method of claim 2, wherein the data signal is made up of a plurality of sequential marks and spaces, wherein the calculated correlations among the periods of the data signal are variation characteristics of current mark or space lengths of the data signal in accordance with previous mark or space lengths of the data signal, and wherein the calculated correlations among the write strategy parameters are variation characteristics of a varying of a write strategy parameter in accordance with other write strategy parameters.

5. The method of claim 2, wherein the determining of the write strategy parameters comprises:

separately calculating variation curves for write strategy parameters;

calculating a correlation matrix using the variation curves; and calculating the determined write strategy parameters by calculating inverse functions of the correlation matrix.

6. The method of claim 5, wherein the correlation matrix is obtained by multiplying slopes of the variation curves by corresponding write strategy parameters and adding y-intercepts of the variation curves to corresponding multiplication results.

7. The method of claim 6, wherein, assuming that the correlation matrix is [M], the correlation matrix has a form of:

$$\begin{bmatrix} M\_A2 \\ M\_A3 \\ M\_A4 \\ \vdots \end{bmatrix} = \begin{bmatrix} a\_22 & a\_23 & a\_24 & \cdots \\ a\_32 & a\_33 & a\_34 & \cdots \\ a\_42 & a\_43 & a\_44 & \cdots \\ \vdots & \vdots & \vdots & \ddots \end{bmatrix} \begin{bmatrix} A\_2 \\ A\_3 \\ A\_4 \\ \vdots \end{bmatrix} + \begin{bmatrix} K\_A2 \\ K\_A3 \\ K\_A4 \\ \vdots \end{bmatrix},$$

where, i of a_ij is a current mark or space length of the data signal, j of a_ij is a previous mark or space length of the data signal, a of a_ij is a slope of a corresponding variation curve, m of A_m is a corresponding mark or space length, A_m is a corresponding write strategy parameter of the mark or space length m, and K_Ai is a y-intercept of a corresponding variation curve when a mark or space length is i.

8. The method of claim 2, wherein the writing of the signal using the predetermined power comprises:

determining a power value by using the initial write strategy and performing first optimum power control on the signal; and using the determined power value as the predetermined power to write the signal to the storage medium.

9. The method of claim 2, further comprising determining whether the written signal has an error by observing a quality of the written signal and then determining that the written signal having an error does not satisfy the defined quality standards, after the data signal is written.

10. The method of claim 2, further comprising executing the initial write strategy instead of calculating the determined write strategy parameters for executing the write strategy for the subsequent writing, if the written signal satisfies the defined quality standards.

11. The method of claim 1, further comprising compensating for errors of deviations generated when the determined write strategy parameters are calculated, wherein the compensating is performed on the determined write strategy parameters by repeating the performing of the determining of the write strategy parameters.

12. The method of claim 11, further comprising:

performing second optimum power control using the determined write strategy parameters after the compensating is performed and determining whether a signal written in accordance with the second optimum power control satisfies the defined quality standards;

executing the write strategy for the subsequent writing using corresponding write strategy parameters on which the compensating is performed and the second optimum power control, if the written signal according to the second optimum power control satisfies the defined quality standards; and repeating the calculating of the variation characteristics, calculating of the correlations among the periods of the data signal and correlations among the write strategy parameters, and the determining of the write strategy parameters for the write strategy for the subsequent writing with a varying of a target mark and/or space length, if the written signal according to the second optimum power control does not satisfy the defined quality standards.

13. The method of claim 12, further comprising:

determining whether the repeating of the calculating of the variation characteristics, calculating of the correlations among the periods of the data signal and correlations among the write strategy parameters, and the determining of the write strategy parameters for the write strategy for the subsequent writing is repeated more than n times; and selecting and applying last determined write strategy parameters for a target mark and/or space length having an optimum writing quality as the write strategy for the subsequent writing, if the repeating of the performing of the writing of the signal is repeated more than n times.

14. The method of claim 1, wherein the writing of the signal to the storage medium, calculating of the variation characteristics, calculating of the correlations among the periods of the data signal and correlations among the write strategy parameters, and the determining of the write strategy parameters for the write strategy for the subsequent writing are performed by a recording and/or reproducing apparatus, with the recording and/or reproducing apparatus comprising a memory to record the initial write strategy and the write strategy for the subsequent writing.

15. The method of claim 1, wherein the writing of the signal to the storage medium, calculating of the variation characteristics, the calculating of the correlations among the periods of the data signal and correlations among the write strategy parameters, and the determining of the write strategy parameters for the write strategy for the subsequent writing are performed post-manufacture of any recording and/or reproducing apparatus performing any of the calculating of the variation characteristics, the calculating of the correlations among the periods of the data signal and correlations among the write strategy parameters, and the determining of the write strategy parameters for the write strategy for the subsequent writing.

16. A method of generating and providing a write strategy by an optical recording/reproducing apparatus, the method comprising:

determining whether the optical recording/reproducing apparatus supports a stored write strategy corresponding to an optical recording medium carried by the optical recording/reproducing apparatus;

writing a signal to the optical recording medium using a predetermined power and a default write strategy, if the optical recording/reproducing apparatus does not support the stored write strategy;

calculating variation characteristics of a data signal, read from the optical recording medium, which separately correspond to variations of write strategy parameters, if the written signal, as read from the optical recording medium, does not satisfy defined quality standards; and calculating correlations among periods of the data signal and correlations among the write strategy parameters by using the variation characteristics of the data signal, and determining corresponding write strategy parameters for a write strategy for subsequent writing to the optical recording medium based on the calculated correlations among the periods of the data signal and the calculated correlations among the write strategy parameters.

17. The method of claim 16, further comprising:

performing optimum power control using the stored write strategy, if the optical recording/reproducing apparatus supports the stored write strategy; and determining whether a signal read from the optical recording medium corresponding to a signal written to the optical recording medium using the stored write strategy with the optimum power control satisfies the defined quality standards.

18. The method of claim 17, further comprising:

performing a writing operation to the optical recording medium using the stored write strategy, if the read signal corresponding to the signal written to the optical recording medium using the stored write strategy satisfies the defined quality standards; and performing the writing of the signal using the predetermined power and the default write strategy, if the optical recording/reproducing apparatus does not support the stored write strategy and the read signal corresponding to the signal written to the optical recording medium using the stored write strategy does not satisfy the defined quality standards.

19. The method of claim 17, further comprising:

performing second optimum power control using the determined write strategy parameters after the determining of the write strategy parameters is performed;

performing a writing operation using first write strategy parameters with the second optimum power control, if a signal read from the optical recording medium corresponding to a signal written by performing the second optimum power control satisfies the defined quality standards; and repeating the calculating of the variation characteristics, calculating of the correlations among the periods of the data signal and correlations among the write strategy parameters, and the determining of the write strategy parameters for the write strategy for the subsequent writing with a varying of a target mark and/or space length of the data signal, if the signal read from the optical recording medium corresponding to the signal written by the performing of the second optimum power control does not satisfy the defined quality standards.

20. The method of claim 17, wherein the determining of the write strategy parameters comprises:

separately calculating variation curves for write strategy parameters, from the data signal;

calculating a correlation matrix using the variation curves; and calculating the determined write strategy parameters by calculating inverse functions of the correlation matrix.

21. An optical recording/reproducing apparatus comprising:

an encoder to convert information data transmitted from a host into a signal to be recorded to an optical recording medium; and a write strategy generator to perform a writing operation of the signal using an optimized write strategy, wherein the write strategy generator writes the signal to the optical recoding medium using a predetermined power and an initial write strategy, and, based upon a determination of whether a signal read from the optical recording medium corresponding to the written signal satisfies defined quality standards, the write strategy generator writes a data signal to the optical recording medium by varying each of plural write strategy parameters in an operation range and calculates write strategy parameters for a write strategy for subsequent writing to the optical recording medium based on calculated correlations among periods of the data signal, as read from the optical recording medium, and calculated correlations among the plural write strategy parameters, as observed from the read data signal.

22. The optical recording/reproducing apparatus of claim 21, wherein the write strategy generator comprises:

an initial writing unit to write the signal to an optical recoding medium using the predetermined power and the initial write strategy;

a data signal observation unit to calculate variation characteristics of the read data signal which separately correspond to variations of write strategy parameters, if the written signal using the initial write strategy does not satisfy the defined quality standards; and an optimized write strategy calculation unit to calculate the correlations among periods of the read data signal and the correlations among write strategy parameters using the variation characteristics of the read data signal, and determining corresponding write strategy parameters for the write strategy for the subsequent writing to the optical recording medium based on the calculated correlations among the periods of the read data signal and the calculated correlations among the write strategy parameters.

23. The optical recording/reproducing apparatus of claim 22, wherein the data signal observation unit determines whether the written signal satisfies the defined quality standards based on a determined amount of timing jitter of the written signal, amount of jitter of rising and falling edges of the written signal, data error that is extracted from the written signal, or determination whether an error occurs due to restored data in which the data error is restored.

24. The optical recording/reproducing apparatus of claim 22, wherein the data signal observation unit automatically receives data regarding a quality of the written signal, evaluates whether the written signal satisfies the defined quality standards based on the received data, and automatically measures variations of the read data signal if the written signal does not satisfy the defined quality standards.

25. The optical recording/reproducing apparatus of claim 22, wherein the write strategy generator separately calculates variation curves for write strategy parameters, calculates a correlation matrix using the variation curves, and calculates the determined write strategy parameters by calculating inverse functions of the correlation matrix.

26. The optical recording/reproducing apparatus of claim 25, wherein the correlation matrix is obtained by multiplying slopes of the variation curves by corresponding write strategy parameters and adding y-intercepts of the variation curves to corresponding multiplication results.

27. The optical recording/reproducing apparatus of claim 25, wherein, assuming that the correlation matrix is [M], the correlation matrix has a form of:

$$\begin{bmatrix} M\_A2 \\ M\_A3 \\ M\_A4 \\ \vdots \end{bmatrix} = \begin{bmatrix} a\_22 & a\_23 & a\_24 & \cdots \\ a\_32 & a\_33 & a\_34 & \cdots \\ a\_42 & a\_43 & a\_44 & \cdots \\ \vdots & \vdots & \vdots & \ddots \end{bmatrix} \begin{bmatrix} A\_2 \\ A\_3 \\ A\_4 \\ \vdots \end{bmatrix} + \begin{bmatrix} K\_A2 \\ K\_A3 \\ K\_A4 \\ \vdots \end{bmatrix},$$

where, i of a_ij is a current mark or space length of the data signal, j of a_ij is a previous mark or space length of the data signal, a of a_ij is a slope of a corresponding variation curve, m of A_m is a corresponding mark or space length, A_m is a corresponding write strategy parameter of the mark or space length m, and K_Ai is a y-intercept of a corresponding variation curve when a mark or space length is i.

* * * * *